United States Patent
Chen et al.

(10) Patent No.: US 6,908,185 B2
(45) Date of Patent: Jun. 21, 2005

(54) PIGMENT-BASED INK-JET INK SYSTEMS WITH POLYURETHANE BINDER AND CRASHING AGENT

(75) Inventors: Xiaohe Chen, San Diego, CA (US); George M. Sarkisian, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/460,541

(22) Filed: Jun. 11, 2003

(65) Prior Publication Data

US 2004/0252169 A1 Dec. 16, 2004

(51) Int. Cl.[7] .................................................. B41J 2/01
(52) U.S. Cl. ........................................ 347/96; 347/100
(58) Field of Search ............................ 347/100, 96, 98, 347/101, 95, 105, 102; 106/31.13, 31.6, 31.27; 523/160; 428/195, 32.1

(56) References Cited

U.S. PATENT DOCUMENTS

| | | | | |
|---|---|---|---|---|
| 5,286,286 A | * | 2/1994 | Winnik et al. | 347/100 |
| 5,328,504 A | * | 7/1994 | Ohnishi | 347/100 |
| 6,270,214 B1 | * | 8/2001 | Smith et al. | 347/101 |
| 6,332,679 B1 | | 12/2001 | Higuma et al. | |
| 6,412,940 B1 | | 7/2002 | Inoue et al. | |
| 6,498,222 B1 | * | 12/2002 | Kitamura et al. | 347/100 |
| 2003/0184629 A1 | * | 10/2003 | Valentini et al. | 347/100 |
| 2004/0110865 A1 | * | 6/2004 | McCovick et al. | 523/160 |

FOREIGN PATENT DOCUMENTS

| | | | | |
|---|---|---|---|---|
| EP | 697445 A2 | * | 2/1996 | C09D/11/00 |
| EP | 0697445 A2 | | 2/1996 | |
| EP | 0712912 A2 | | 5/1996 | |
| EP | 0724968 A1 | | 8/1996 | |
| EP | 1256459 A2 | | 11/2002 | |
| EP | 1270251 | | 1/2003 | |
| WO | WO 03/062331 A1 | * | 7/2003 | C09D/11/00 |

* cited by examiner

*Primary Examiner*—Manish Shah

(57) ABSTRACT

The present invention is drawn toward systems, methods, and images printed on substrate. The system includes a porous media substrate, an ink-jet ink including a self-dispersed pigment and a polyurethane binder having acid value 20 to 100, wherein the ink-jet ink is configured for being printed on the porous media substrate, and a fixing fluid including a crashing agent, wherein the fixing fluid is configured for being overprinted or underprinted with respect to the ink-jet ink.

22 Claims, No Drawings

PIGMENT-BASED INK-JET INK SYSTEMS WITH POLYURETHANE BINDER AND CRASHING AGENT

FIELD OF THE INVENTION

The present invention relates to ink-jet systems, methods, and fast-drying durable images.

BACKGROUND OF THE INVENTION

As the ink-jet printing field develops, improvements in printing characteristics such as edge acuity, optical density, substrate adherence, dry time, resolution, durability, and waterfastness continue to be explored. At the same time, while trying to improve upon these characteristics, fluids of the ink-jet system should also provide long term storage compositional stability and long term reliability without equipment corrosion or nozzle clogging. Though the above lists of characteristics provide a worthy goal, there are difficulties associated with satisfying all of the above characteristics. Often, the inclusion of an ink component meant to satisfy one of the above characteristics can prevent another characteristic from being met. Thus, most commercial inks for use in ink-jet printers represent a compromise in an attempt to achieve at least an adequate response in meeting all of the above listed objectives.

Various substances have been used to formulate ink-jet inks and other recording solutions in an attempt to meet the above objectives. Some of these substances have been included are pigments and/or dyes to provide color to the image, water and/or water-soluble organic solvents to provide a liquid composition that functions properly within ink-jet equipment, surfactants of various ionic character to provide decreased surface tension at various liquid interfaces, dispersants for enhancing solubility characteristics, and various other solution characteristic modifiers such as viscosity modifiers, pH adjustors, antiseptics, antioxidants, chelating agents, biocides, and the like.

Printing media has also been modified to utilize a variety of substances, including various binding materials to improve recording parameters. These binding materials can include inorganic porous coatings, such as silica and alumina, or swellable organic coatings, such as gelatins and other similar compositions. These materials can be coated on a paper or other substrate to provide improvement in image quality when an ink-jet ink is printed thereon, as is generally known in the art.

A development in the ink-jet printing area has been the use of ink-jet inks concurrent with another solution in a two pen ink system. Such other solutions can be formulated to operate with the ink to provide more durable images and/or enhancement in image color and clarity.

Many pigment-based ink-jet systems can have relatively slow drying times due in part to the vehicle components typically used to disperse the pigments and maintain customary long term reliability and durability during use and storage. Another reason for the lack of optimal performance can be related to the presence of certain binders often present in these pigment-based ink-jet ink compositions. Many binders known to be used can improve permanence greatly, but can actually slow the drying process.

As a result of the state of the art, it would be desirable to provide ink-jet systems, methods, and ink-jet images printed on a porous media substrate that can be prepared with reduced drying time, while maintaining adequate print durability after printing, as well as long term storage stability while the printing fluids are housed in the ink-jet pen.

SUMMARY OF THE INVENTION

It has been recognized that certain components can be used for ink-jet printing fast-drying durable images. As such, a system for ink-jet printing fast-drying durable images can comprise a porous media substrate, an ink-jet ink including a self-dispersed pigment and a polyurethane binder, and a fixing fluid including a crashing agent. The ink-jet ink can be configured for printing on the porous media substrate, and the fixing fluid can be configured for being overprinted or underprinted with respect to the ink-jet ink.

Alternatively, a method for ink-jet printing fast-drying durable images, can comprise the steps of (a) jetting an ink-jet ink including a self-dispersed pigment and a polyurethane binder onto a porous media substrate; and (b) jetting a fixing fluid onto the porous media substrate, wherein the fixing fluid includes a crashing agent, and wherein the fixing fluid is underprinted or overprinted with respect to the ink-jet ink.

In another embodiment, an ink-jet printed image on a substrate can comprise a porous media substrate, and at least two fluids printed thereon. The at least two fluids can include an ink-jet ink including a self-dispersed pigment and a polyurethane binder, and a fixing fluid including a crashing agent. The fixing fluid can be overprinted or underprinted with respect to the ink-jet ink. Further, the ink-jet ink provides color to the image, and the fixing fluid can provide durability to the image. The combination of the ink-jet ink and the fixing fluid on the substrate can provide a fast-drying durable image.

Additional features and advantages of the invention will be apparent from the detailed description that follows, which illustrates, by way of example, features of the invention.

DETAILED DESCRIPTION OF THE PREFERRED EMBODIMENT(S)

Before the present invention is disclosed and described, it is to be understood that this invention is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof.

The single forms "a," "an," and, "the" include plural referents unless it is clear the context is otherwise. For example, "an ink" includes reference to one or more of such inks.

As used herein, "effective amount" refers to at least a minimal amount sufficient for achieving a desirable result. For example, an effective amount of a "liquid vehicle" is at least the minimum amount required in order to create an ink-jet ink composition and/or a fixer fluid, while maintaining properties effective for ink- or fluid-jetting, respectively.

The use herein of "liquid vehicle," refers to compositions which can include polymers, viscosity modifiers, pH adjustors, antiseptics, antioxidants, chelating agents, biocides, surfactants, solvents, co-solvents, water, and/or various other solution characteristic modifiers without limitation. Liquid vehicles are well known in the art, and a wide variety of liquid vehicles can be used in the ink-jet systems, methods, and in preparing the ink-jet images in accordance with embodiments of the present invention.

An "ink" or "ink-jet ink" refers to a solution composition that can comprise a liquid vehicle, a pigment, and a water-soluble polyurethane binder. The liquid vehicle can be configured to be stable with the pigment and the polyurethane binder through a broad range of solution characteristics, and can be configured for ink-jet printing. The pigment can be a self-dispersed pigment primarily for providing color to any resulting image. The polyurethane binder can be any polyurethane particulate having a weight average molecular weight from 3000 Mw to 10000 Mw.

A "fixing fluid" or "fixer" refers to a solution composition that comprises a liquid vehicle and a crashing agent. The liquid vehicle, with the crashing agent, can be configured to be chemically stable under a broad range of solution characteristics, and can be configured for ink-jet printing. The crashing agent can be a polymeric, acidic, and/or an ionic agent, that is configured to crash or react with at least one compositional component of an associated ink-jet ink (to be overprinted or underprinted on a substrate therewith).

The term "crashing agent" refers to any single chemical or combination of chemicals in the fixing fluid that can facilitate the desolubilization or precipitation of components in the ink. The desolubilizing can be accomplished by proton transfer from collision or close proximity of the crashing agent with one or more of the self-dispersing pigment, polyurethane binder, and/or other ink-jet ink component. The desolubilizing can be accomplished by component associations induced by the crashing agent and/or component associations occurring with the crashing agent.

The terms "overprinting" and "underprinting" refer to processes of printing where a first printing solution is printed onto a substrate, and subsequently, a second printing solution is printed onto the first printed solution. The first printing solution would be said to be underprinted with respect to the second printing solution. The second printing solution would be said to be overprinted with respect to the first printing solution. For example, in some embodiments, an ink can be printed onto a porous media substrate, and then, a fixing fluid can be printed onto the ink. In this example, the fixing fluid is overprinted with respect to the ink. Alternatively, a fixing fluid can be printed onto a porous media substrate, and then, an ink can be printed onto the fixing fluid. In this latter example, the fixing fluid is underprinted with respect to the ink.

It is to be understood that when referring to printing or jetting an ink-jet ink or fixing fluid "on" or "onto" a porous media substrate, embodiments wherein both underprinting and overprinting with respect to the ink or fluid printed "on" the porous media substrate are included. For example, if an ink-jet ink is said to be configured for printing "on" a porous media substrate, and a fixing fluid is said to be configured for being underprinted with respect to the ink-jet ink, then technically, the ink-jet ink is printed on the fixing fluid (which is printed on the porous media substrate). In this example, the ink-jet ink would still be defined as being configured for printing on the porous media substrate. In other words, the presence of an intervening underprinted layer between the ink-jet ink and the porous media substrate does not deter from the fact that the ink-jet ink is configured for printing on the porous media substrate. This same distinction is also true with respect to related methods. For example, steps of jetting an ink-jet ink and a fixing fluid onto a porous media substrate does not infer that one cannot be overprinted or underprinted with respect to the other.

The general term "polymers" refers to homopolymers, heteropolymers, cross-linked polymers, block copolymers, graft copolymers, random copolymers, or combinations thereof.

"Self-dispersed pigment" or "self-dispersing pigment" refers to a pigment physically or chemically attached to a dispersant agent, such as a polymeric dispersant. A self-dispersed pigment can be adequately dispersed in solution for purposes of ink-jetting and storage stability without the aid of other solubilizing agents, though such agents can optionally be present in the liquid vehicle.

Accordingly, an ink-jet system can comprise a porous media substrate, an ink-jet ink, and a fixing fluid. The porous media substrate can be configured for receiving ink-jet ink and/or fixing fluid. Additionally, the ink-jet ink can comprise a self-dispersed pigment and a polyurethane binder, and can further be configured for printing directly on the porous media substrate, or onto a pre-printed fixing fluid, depending on whether the ink-jet ink is overprinted or underprinted with respect to the fixing fluid. The fixing fluid can comprise a crashing agent, which is configured to crash one or more components present in the ink-jet ink. As stated, the fixing fluid can be jetted onto the substrate either before (underprinted) or after (overprinted) the ink-jet ink.

In another embodiment of the present invention, a method for ink-jet printing fast-drying durable images is provided. Such a method can comprise the steps of jetting an ink-jet ink and a fixing fluid onto a substrate. This can be done sequentially such that the fixing fluid is either overprinted or underprinted with respect to the ink-jet ink. In one embodiment, the substrate can be a porous media substrate configured for receiving a jetted ink-jet ink and/or a jetted fixing fluid. The ink-jet ink can comprise a self-dispersed pigment and a polyurethane binder, and the fixing fluid can comprise a crashing agent.

In another embodiment, an ink-jet printed image on a substrate can comprise a porous media substrate, and at least two fluids printed thereon. The at least two fluids can include an ink-jet ink including a self-dispersed pigment and a polyurethane binder, and a fixing fluid including a crashing agent. The fixing fluid can be overprinted or underprinted with respect to the ink-jet ink, wherein the ink-jet ink provides color to the image, and the fixing fluid and ink-jet ink together provide durability to the image. The combination of the ink-jet ink and the fixing fluid on the substrate can provide a fast-drying durable image.

With respect to each of the above embodiments, upon printing both the ink-jet ink and the fixing fluid sequentially at 60 to 120 ng per 300 dpi, the image can become dry to the touch in less than 5 seconds, and in some embodiments, even less than about 3 seconds. In one embodiment, this is particularly true with respect to ink-jet images printed on porous media substrates having a coating comprising calcium carbonate, alumina, and/or silica.

Ink-Jet Ink

As stated previously, ink-jet inks that can be used in accordance with embodiments of the present invention can include a liquid vehicle, a self-dispersed pigment, and a polyurethane binder. The use of self-dispersed pigments comprising a pigment having a dispersant polymer physically attached or chemically tethered thereto can provide good results with respect to dry time and durability. Examples of such physical attachment or chemical tethering can be through hydrophobic-hydrophilic attraction, ionic association, covalent bonding, physical adsorption, or other known attachment mechanism. The pigment can be of any color, and the present invention embodiments are not limited to specific pigments. Further, the pigments can be neutral, cationic, anionic, hydrophilic, and/or hydrophobic, without limitation.

As mentioned, the dispersant polymer can be covalently linked and/or tethered to the pigment. This chemical attraction or bonding between the dispersant polymer and the pigment can be at a single location or at multiple locations of the dispersant polymer and pigment, respectively. In one embodiment, from 1 wt % to 50 wt % of the dispersant polymer can be directly attached to the surface of the pigment. The balance of the dispersant polymer that is not directly attached to the surface of the pigment can tethered to the attached dispersant polymer/pigment surface, thereby forming hair-like polymeric structures extending from the surface of the pigment. In a more detailed embodiment, from 10 wt % to 30 wt % of the dispersant polymer can be directly covalently linked to the pigment. Exemplary self-dispersed pigments are commercially available such as CaboJet 200, CaboJet 300, and the like. Such self-dispersed pigment can be present in the ink-jet ink at from 1 wt % to 10 wt %, or any incremental range therein.

The use of a dispersant polymer attached and/or chemically tethered to a pigment can provide the resulting self-dispersed pigment with enhanced solubility. An example of such a dispersant polymer includes water-soluble polymeric resin(s), as long as the resin(s) function to stabilize and disperse the pigment in solution. A polymeric resin that can be used includes those having a weight average molecular weight in a range of 1,000 Mw to 30,000 Mw, or any incremental range therein. For example, in a more detailed embodiment, the polymer can have a weight average molecular weight in a range from 3,000 Mw to 10,000 Mw. Specifically, the resin can be a polymer, block copolymer, tri-block copolymer, graft copolymer, random copolymer, or the like. Additionally, the polymer can include one or more monomers with characteristics such as hydrophilic, hydrophobic, neutral, cationic, anionic, amphoteric, and combinations thereof. Exemplary monomers that can be used to form such polymers and copolymers include, without limitation, styrene, styrene derivatives, vinylnaphthalene, vinyinaphthalene derivatives, aliphatic alcohol esters, of α-, β-ethylenically unsaturated carboxylic acids, acrylic acid, acrylic acid derivatives, maleic acid, maleic acid derivatives, itaconic acid, itaconic acid derivatives, fumaric acid and fumaric acid derivative, and the like, and combinations thereof.

The ink-jet ink can also comprise a polyurethane binder. The polyurethane binder can be present in the ink-jet ink at from 0.1 wt % to 10.0 wt %. In one embodiment, polyurethane having a weight average molecular weight in a range of 3000 Mw to 10000 Mw can be used. In a more detailed embodiment, the polyurethane can be present at a weight average molecular weight range from 4000 to 6000. The polyurethane binder can also have any acid value from 20 to 100. In another embodiment, the polyurethane binder can have any acid value from 30 to 80.

The polyurethane binder can facilitate the adherence of the self-dispersed pigment to a substrate. For example, the polyurethane can act to bridge or anchor the hair-like polymers attached to and extending from the self-dispersed pigment to the substrate. In another embodiment, the polyurethane can enhance the electrostatic attraction and interactions of various components of the ink-jet ink and the fixing fluid, once both are printed on substrate. Such attractions can cause the ink-jet ink components to associate closely together on the substrate, thereby facilitating adherence of a self-dispersed pigment to the substrate. In another aspect, the polyurethane can enhance the formation of a matrix on the substrate, thereby facilitating adherence of the self-dispersed pigment to the substrate. In this aspect, the matrix can enhance the durability of an ink-jet image on the substrate.

Fixing Fluid

As previously described, a fixing fluid can be configured for jetting on a substrate either before or after an ink-jet ink, such as by overprinting or underprinting with respect to the ink-jet ink. Typically, the fixing fluid can be jetted from a separate pen, or from a separate jetting orifice(s) of the same pen, with respect to the ink-jet ink.

The fixing fluid can include a liquid vehicle and a crashing agent, and the combination can be configured to be ink-jettable. Though colorant can be present in the fixing fluid, a substantially colorless fixing fluid exemplifies a typical embodiment. The crashing agent can be any crashing agent that acts to crash one or more inkjet ink component, thereby improving durability and waterfastness of an ink-jet ink image printed on a media substrate. Though any functional amount of crashing agent can be present in the fixing fluid, from about 0.5 wt % to 8.0 wt % can be included.

The crashing agent can be polymeric and/or include ionic groups, which can be either cationic or anionic. In one embodiment, crashing agent is a polymeric ionic (cationic) crashing agent such as a polyamine. Such a polyamine crashing agent can have a weight average molecular weight from about 200 Mw to 50000 Mw, though any function molecular weight can be used. Examples of polyamines can include those selected from the group consisting of polyguanidine, polyethylenimine, polyvinylpyridine, polyvinylamine, polyallylamine, polyacrylamine, polyacrylamide, polyquaternaryamine, cationic polyurethane, aminecellulose, polysacchride amine, and combinations thereof.

Alternately, the crashing agent can be any acidic agent, or multivalent acidic salts such as calcium nitrate or magnesium nitrate, that acts to crash one or more ink-jet ink component to improve image durability and waterfastness. Since embodiments of the present invention can be used in conjunction with state of the art ink-jet pens, certain acidic agents, though functional, could damage these ink-jet pens over time, as well as provide other unfavorable characteristics. Though less preferred, such acidic agents are still within the scope of the present invention.

Keeping pen reliability in mind, acidic agents can be included in functional amounts, examples of which include succinic acid, glycolic acid, citric acid, nitric acid, hydrochloric acid, phosphoric acid, sulfuric acid, polyacrylic acid, acetic acid, malonic acid, maleic acid, ascorbic acid, glutaric acid, fumaric acid, tartaric acid, lactic acid, nitrous acid, boric acid, carbonic acid, carboxylic acids such as formic acid, chloroacetic acid, dichloroacetic acid, trichloroacetic acid, fluoroacetic acid, trimethylacetic acid, methoxyacetic acid, mercaptoacetic acid, propionic acid, butyric acid, valeric acid, caproic acid, caprylic acid, capric acid, lauric acid, myristic acid, palmitic acid, stearic acid, oleic acid, rinolic acid, rinoleic acid, cyclohexanecarboxylic acid, phenylacetic acid, benzoic acid, o-toluic acid, m-toluic acid, p-toluic acid, o-chlorobenzoic acid, m-chlorobenzoic acid, p-chlorobenzoic acid, o-bromobenzoic acid, m-bromobenzoic acid, p-bromobenzoic acid, o-nitrobenzoic acid, m-nitrobenzoic acid, p-nitrobenzoic acid, oxalic acid, adipic acid, phthalic acid, isophthalic acid, terephthalic acid, salicylic acid, p-hydrobenzoic acid, anthranilic acid, m-aminobenzoic acid, p-aminobenzoic acid, benzenesulfonic acid, methylbenzenesulfonic acid, ethylbenzenesulfonic acid, dodecylbenzenesulfonic acid, 5-sulfosalicylic acid, 1-sulfonaphthalene, hexanesulfonic acid, octanesulfonic acid, dodecanesulfonic acid, amino acids such as glycine, alanine, valine, α-aminobutyric acid, α-aminobutryic acid, α-alanine, taurine, serine, α-amino-n-caproic acid, leucine, norleucine, phenylalanine, and the like, and combinations thereof.

Liquid Vehicle

The liquid vehicles and components described herein are applicable with respect to both the ink-jet ink and the fixing fluid. It is understood that these components are exemplary and do not limit the scope of vehicle components that can be used. In some embodiments of the present invention it may be favorable for the liquid vehicle to comprise water-soluble organic solvents, co-solvents, and other additives as a liquid medium. The balance of any embodiment formulation can be purified water, or other vehicle component known in the art.

The water-soluble organic solvents and/or co-solvents that can be used in the present invention include, but is not limited to, dimethylformamide, dimethylacetamide, acetone, tetrahydrofuran, dioxane, polyethylene glycol, polypropylene glycol, ethylene glycol, propylene glycol, butylene glycol, 1,2-hexanediol, triethylene glycol, 1,2,6-hexanetriol, thiodiglycol, hexylene glycol, diethylene glycol, ethylene glycol methyl ether, diethylene glycol monomethyl ether, triethylene glycol monomethyl ether, ethanol isopropyl alcohol, n-butyl alcohol, isobutyl alcohol, glycerol, n-methyl-2-pyrrolidone, 1,3-dimethylimidazolidinone, triethanolamine, sulfolane, dimethyl sulfoxide, and the like, as well as other amines, ketones, ethers, polyalkylene glycols, alkylene glycols, lower alkyl ethers of polyhydric alcohols, monohydric alcohols, and combinations thereof.

Additionally, the liquid vehicle can comprise humectants. Humectants can be present to enhance the longevity of solution and solubility characteristics, which can be maintained by retention of moisture within the liquid vehicle. Examples of humectants include, but are not limited to, nitrogen-containing compounds such as urea, thiourea, ethylene urea, alkylurea, alkylthiourea, dialkylurea, dialkylthiourea; sugars such as 1-deoxy-D-galactitol, mannitol, and inositol, and combinations thereof.

The liquid vehicle can also comprise solution characteristic modifiers such as viscosity modifiers, pH adjusters, preservatives, various types of surfactant, antioxidants, and evaporation accelerators. Examples of surfactants include primary, secondary, and tertiary amine salt compounds such as hydrochloric acid salts, acetic acid salts of laurylamine, coconut amine, stearylamine, rosin amine; quaternary ammonium salt type compounds such as lauryltrimethylammonium chloride, cetyltrimethylammonium chloride, benzyltributylammonium chloride, benzalkonium chloride, etc.; pyridinium salty type compounds such as cetylpyridinium chloride, cetylpyridinium bromide, etc.; nonionic surfactant such as polyoxyethylene alkyl ethers, polyoxyethylene alkyl esters, acetylene alcohols, acetylene glycols; and other surfactants such as 2-heptadecenyl-hydroxyethylimidazoline, dihydroxyethylstearylamine, stearyldimethylbetaine, and lauryldihydroxyethylbetaine; and combinations thereof.

pH adjustors that can be used comprise base agents such as sodium hydroxide, lithium hydroxide, sodium carbonate, ammonium carbonate ammonia sodium acetate, ammonium acetate, morpholine, monoethanolamine, diethanolamine, triethanolamine, ethylmonoethanolamine, n-butyidiethanolamine, di-n-butylethanolamine, monoisopropanolamine, diisopropanolamine, and triisopropanolamine, and the like as well as combinations thereof. Additionally, pH adjustors can also comprise acidic agents that can be selected from the list of acidic crashing agents.

Consistent with the formulation of this invention, various other additives can be used to optimize the properties of the ink composition for specific applications. Examples of these additives are those added to inhibit the growth of harmful microorganisms. These additives may be biocides, fungicides, and other microbial agents, which are routinely used in liquid vehicle formulations. Examples of suitable microbial agents include, but are not limited to, Nuosept (Nudex, Inc.), Ucarcide (Union carbide Corp.), Vancide (R.T. Vanderbilt Co.), Proxel (ICI America), and combinations thereof.

Sequestering agents, such as EDTA (ethylene diamine tetra acetic acid) and the like, may be included to eliminate the deleterious effects of heavy metal impurities.

EXAMPLES

The following examples illustrate the embodiments of the invention that are presently best known. However, it is to be understood that the following are only exemplary or illustrative of the application of the principles of the present invention. Numerous modifications and alternative compositions, methods, and systems may be devised by those skilled in the art without departing from the spirit and scope of the present invention. The appended claims are intended to cover such modifications and arrangements. Thus, while the present invention has been described above with particularity, the following Examples provide further detail in connection with what are presently deemed to be the most practical and preferred embodiments of the invention.

Example 1

Inkjet Inks and Physical Properties

Seven ink-jet ink compositions were prepared using different formulations to test for variations in dry time and durability. Five of the ink formulations were prepared with polyurethane (B, D, E, F, and G), and two inks were prepared without polyurethane (A and C). The physical properties were measured to determine the surface tension and viscosity of each ink formulation. The resultant ink-jet ink compositions and corresponding physical properties are shown in Tables 1a and 1b blow.

TABLE 1a

| Ink-jet ink composition (wt %) | Ink-jet ink compositions | | | | | | |
| --- | --- | --- | --- | --- | --- | --- | --- |
| | A | B | C | D | E | F | G |
| Cabot black pigment IJX 600 | 3.0 | 3.0 | 3.0 | 3.0 | 3.0 | 3.0 | 3.0 |
| 10% Joncryl 586/water | 18.0 | 8.0 | 18.0 | 0.0 | 0.0 | 0.0 | 8.0 |
| Polyurethane 3570 Mw, 60 acid value | 0.0 | 1.8 | 0.0 | 1.8 | 1.6 | 1.2 | 1.8 |

TABLE 1a-continued

Ink-jet ink compositions

| Ink-jet ink composition (wt %) | A | B | C | D | E | F | G |
|---|---|---|---|---|---|---|---|
| 1,3-Bis(2-hydroxyethyl)-5,5-dimethylhydantoin | 7.0 | 7.0 | 7.0 | 6.0 | 6.0 | 6.0 | 6.0 |
| 2-pyrrolidone | 7.0 | 7.0 | 7.0 | 7.0 | 7.0 | 7.0 | 7.0 |
| 1,2-hexanediol | 4.0 | 4.0 | 2.0 | 4.0 | 4.0 | 4.0 | 4.0 |
| Ethoxylated Glycerol | 1.5 | 1.5 | 1.5 | 0.0 | 0.0 | 0.0 | 0.0 |
| Water | bal | bal | bal | bal | bal | bal | bal |

TABLE 1a

Ink-jet ink physical properties

| Ink-jet ink physical properties | A | B | C | D | E | F | G |
|---|---|---|---|---|---|---|---|
| Surface tension (dynes/cm) | 36.3 | 35.5 | 39.6 | 35.2 | 35.1 | 35.2 | 35.6 |
| Viscosity (cps) | 2.76 | 2.77 | 2.52 | 2.38 | 2.27 | 2.25 | 2.48 |

The physical properties of the various ink-jet inks, whether including polyurethane (B, D, E, F, and G) or excluding polyurethane (A and C), had similar surface tension and viscosity. As a result, similar jetting characteristics existed with respect to each of the ink-jet inks.

Example 2

Fixing Fluid and Physical Properties

A fixing fluid was prepared to be tested with the ink-jet inks of Example 1 in accordance with embodiments of the present invention. The fixing fluid composition and physical properties are shown in Tables 2a and 2b below.

TABLE 2a

Fixing fluid composition

| Fixing Fluid Composition | wt % |
|---|---|
| Succinic acid | 4.00 |
| Poly(hexamethylene biguanide) | 2.44 |
| Ethoxylated 2,4,7,9-tetramethyl-5-decyne-4,7-diol | 0.30 |
| 3,5-dimethyl-1-hexyn-3-ol | 0.25 |
| 1,3-Bis(2-hydroxyethyl)-5,5-dimethylhydantoin | 6.00 |
| 2-pyrrolidone | 6.00 |
| Tinolux | 0.25 |
| Water | bal |

TABLE 2b

Fixing fluid physical properties

| Fixing Fluid physical properties | |
|---|---|
| Surface tension (dynes/cm) | 28.46 |
| Viscosity (cps) | 1.64 |
| pH | 3.94 |

Example 3

Ink-Jet Ink and Fixing Fluid Durability and Dry Time Results

Seven images were produced by underprinting the fixing fluid of Example 2 with respect to the ink-jet inks of Example 1, respectively, on silica-based porous media. The amount fluid for each image printed was 120 ng per 300 dpi. The images were analyzed by the following tests: (1) dry time analysis, (2) dry image optical density (OD) analysis, and (3) wet smudge OD analysis. Test 1 and 2 are self explanatory. Test 3, or wet smudge OD analysis, tests the optical density of areas around the printed image after applying a damp instrument to the image and smearing the image. Thus, the lower the OD for the wet smudge test, the more desirable the result. The test results for the polyurethane containing inks (B, D, E, F, and G) were compared to the inks lacking polyurethane (A and C), and are shown in Table 3 below.

TABLE 3

Analysis results of various ink-jet inks underprinted with fixer

| Ink | A | B | C | D | E | F | G |
|---|---|---|---|---|---|---|---|
| Dry time (sec) | 10 | 5 | 8 | 3 | 5 | 5 | 3 |
| Dry image OD | 1.45 | 1.41 | 1.48 | 1.49 | 1.51 | 1.52 | 1.35 |
| Wet smudge OD | 0.19 | 0.14 | 0.2 | 0.22 | 0.23 | 0.26 | 0.21 |

As seen in Table 3 above, images resulting from polyurethane containing inks (B, D, E, F, and G) had decreased dry time compared to the images resulting from inks lacking polyurethane (A and C), but all formulations resulted in similar print properties and durability (as indicated by the dry image OD and wet smudge OD comparison). The fastest dry times were achieved in polyurethane containing inks D and G. The slowest dry times resulted from inks A and C, which lacked polyurethane. Thus, an ink-jet system and a method of printing can result in a fast-drying image on a porous media substrate, while maintaining good durability.

While the present invention has been described with reference to certain preferred embodiments, those skilled in the art will appreciate that various modifications, changes, omissions, and substitutions can be made without departing from the spirit of the invention. It is to be understood that the present invention is not limited to the disclosed embodiments. The invention is intended to cover various modifications and equivalent arrangements included within the spirit and scope of the claims. Therefore, it is intended that the invention be limited only by the scope of the following claims, where the claims are to be given the broadest interpretation so as to encompass all such modifications and equivalent arrangements.

What is claimed is:

1. A system for ink-jet printing fast-drying durable images, comprising:
   (a) a porous media substrate;
   (b) an ink-jet ink including a self-dispersed pigment and a polyurethane binder having an acid value from 20 to 100, said ink-jet ink configured for being printed on the porous media substrate;
   (c) a fixing fluid including a crashing agent, said fixing fluid configured for being overprinted or underprinted with respect to the ink-jet ink.

2. A system as in claim 1, wherein the porous media substrate includes a coating comprising a material selected from the group consisting of alumina, silica, and combinations thereof.

3. A system as in claim 1, wherein the self-dispersed pigment includes a pigment covalently bound to a dispersant polymer, said polymer having a weight average molecular weight from 3000 Mw to 10000 Mw.

4. A system as in claim 3, wherein the pigment is an anionic pigment.

5. A system as in claim 3, wherein from 1 wt % to 50 wt % of the dispersant polymer is directly attached to the pigment.

6. A system as in claim 1, wherein the polyurethane binder is present in the ink-jet ink at from 0.1 wt % to 10.0 wt %.

7. A system as in claim 1, wherein the self-dispersed pigment is present in the ink-jet ink at from 1 wt % to 10 wt %.

8. A system as in claim 1, wherein the polyurethane binder has a weight average molecular weight from 3000 Mw to 10000 Mw.

9. A system as in claim 1, wherein the fixing agent is overprinted with respect to the ink-jet ink.

10. A system as in claim 1, wherein the fixing fluid is underprinted with respect to the ink-jet ink.

11. A system as in claim 1, wherein the crashing agent is a polymeric ionic crashing agent selected from the group consisting of polyguanidine, polyethylenimine, polyvinylpyridine, polyvinylamine, polyallylamine, polyacrylamine, polyacrylamide, polyquaternaryamine, cationic polyurethane, aminecellulose, polysaccharide amine, and combinations thereof.

12. A system as in claim 1, wherein the crashing agent is an acidic crashing agent selected from the group consisting of succinic acid, glycolic acid, citric acid, nitric acid, hydrochloric acid, phosphoric acid, sulfuric acid, polyacrylic acid, acetic acid, malonic acid, maleic acid, ascorbic acid, glutaric acid, fumaric acid, tartaric acid, lactic acid, nitrous acid, boric acid, carbonic acid, carboxylic acids such as formic acid, chloroacetic acid, dichloroacetic acid, trichloroacetic acid, fluoroacetic acid, trimethylacetic acid, methoxyacetic acid, mercaptoacetic acid, propionic acid, butyric acid, valeric acid, caproic acid, caprylic acid, capric acid, lauric acid, myristic acid, palmitic acid, stearic acid, oleic acid, rinolic acid, rinoleic acid, cyclohexanecarboxylic acid, phenylacetic acid, benzoic acid, o-toluic acid, m-toluic acid, p-toluic acid, o-chlorobenzoic acid, m-chlorobenzoic acid, p-chlorobenzoic acid, o-bromobenzoic acid, m-bromobenzoic acid, p-bromobenzoic acid, o-nitrobenzoic acid, m-nitrobenzoic acid, p-nitrobenzoic acid, oxalic acid, adipic acid, phthalic acid, isophthalic acid, terephthalic acid, salicylic acid, p-hydrobenzoic acid, anthranilic acid, m-aminobenzoic acid, p-aminobenzoic acid, benzenesulfonic acid, methylbenzenesulfonic acid, ethylbenzenesulfonic acid, dodecylbenzenesulfonic acid, 5-sulfosalicylic acid, 1-sulfonaphthalene, hexanesulfonic acid, octanesulfonic acid, dodecanesulfonic acid, amino acids such as glycine, alanine, valine, $\alpha$-aminobutyric acid, $\alpha$-aminobutryic acid, $\alpha$-alanine, taurine, serine, $\alpha$-amino-n-caproic acid, leucine, norleucine, phenylalanine, and combinations thereof.

13. A method for ink-jet printing a fast-drying durable image, comprising steps of:
   (a) jetting an ink-jet ink including a self-dispersed pigment and a polyurethane binder onto a porous media substrate;
   (b) jetting a fixing fluid onto the porous media substrate, said fixing fluid including a crashing agent, wherein said fixing fluid is underprinted or overprinted with respect to the ink-jet ink; and
   (c) substantially drying the image in less than 5 seconds when printed on the porous media substrate at from 60 to 120 ng per 300 dpi.

14. A method as in claim 13, wherein the fixing agent is overprinted with respect to the ink-jet ink.

15. A method as in claim 13, wherein the fixing fluid is underprinted with respect to the ink-jet ink.

16. An ink-jet printed image on a substrate, comprising:
   (a) a porous media substrate, and
   (b) at least two fluids printed thereon, said at least two fluids including:
      i) an ink-jet ink including a self-dispersed pigment and a polyurethane binder, and
      ii) a fixing fluid including a crashing agent, said fixing fluid being overprinted or underprinted with respect to the ink-jet ink,
   wherein the ink-jet ink provides color to the image, the fixing fluid provides durability to the image, the polyurethane binder provides a bridge that adheres or attaches the self-dispersed pigment to the substrate, and wherein the combination of the ink-jet ink and the fixing fluid on the substrate provides a fast-drying durable image.

17. A fast-drying durable image as in claim 16, wherein the fixing fluid is overprinted with respect to the ink-jet ink.

18. A fast-drying durable image as in claim 16, wherein the fixing fluid is underprinted with respect to the ink-jet ink.

19. A fast-drying durable image as in claim 16, wherein the porous media substrate includes a coating comprising a material selected from the group consisting of alumina, silica, and combinations thereof.

20. A fast-drying durable image as in claim 16, wherein the self-dispersed pigment includes a pigment covalently bound to a dispersant polymer, said polymer having a weight average molecular weight from 3000 to 10000.

21. A fast-drying durable image as in claim 20, wherein the pigment is an anionic pigment.

22. A fast-drying durable image as in claim 16, wherein the polyurethane binder has a weight average molecular weight from 3000 to 10000.

* * * * *